UNITED STATES PATENT OFFICE.

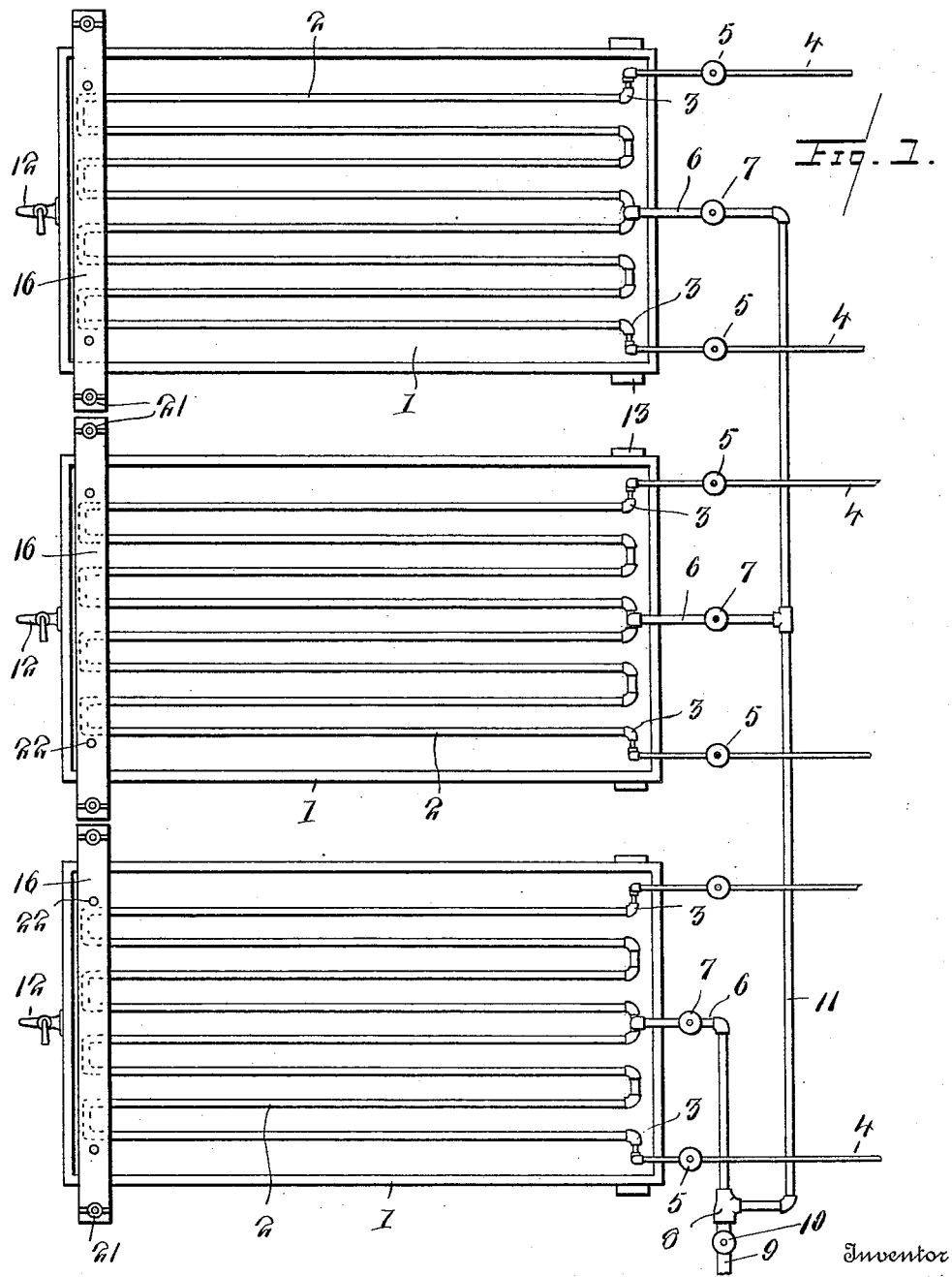

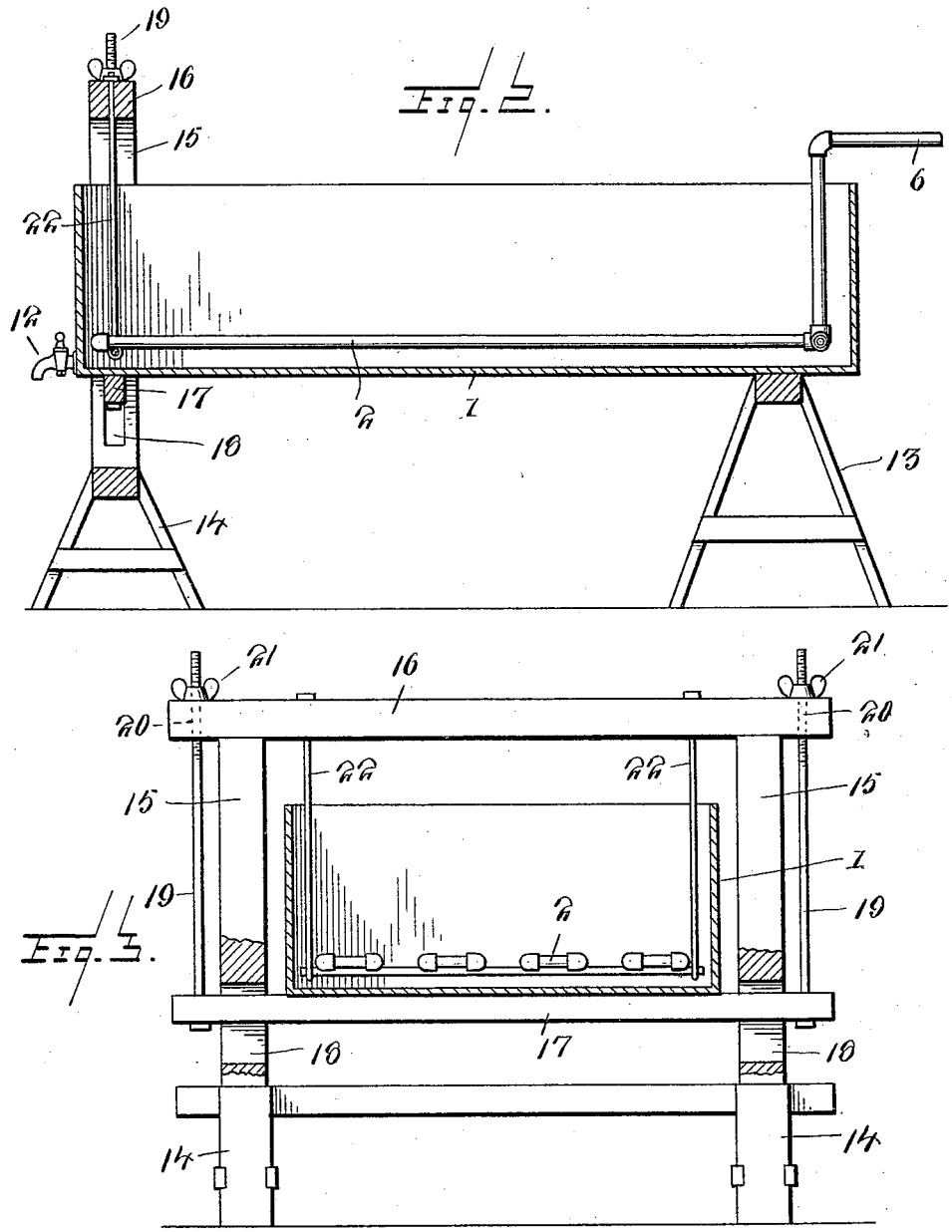

THOMAS E. KENNAIRD, OF ROSEVILLE, KENTUCKY.

EVAPORATOR.

1,051,959.  Specification of Letters Patent.  Patented Feb. 4, 1913.

Application filed April 13, 1912. Serial No. 690,544.

*To all whom it may concern:*

Be it known that I, THOMAS E. KENNAIRD, a citizen of the United States, residing at Roseville, in the county of Barren and State of Kentucky, have invented new and useful Improvements in Evaporators, of which the following is a specification.

This invention relates to evaporators for boiling sugar cane and other juices or saps in the production of molasses or purification of juices or saps for any desired purpose.

The main object of the invention is to provide an evaporating apparatus wherein steam is employed as the heating agent, and which insures economy of time and labor in the boiling and purification of the juice over the ordinary practice of fire-boiling, and at the same time enables a superior product to be obtained.

A further object of the invention is to provide means whereby the supply of steam to the heat radiators may be controlled to regulate the temperature to the desired degree, and to provide means whereby the purified juice or sap may be drawn off from the evaporating pans in a simple and expeditious manner.

The invention consists of the features of construction, combination and arrangement of parts, hereinafter fully described and claimed, reference being had to the accompanying drawings, in which:—

Figure 1 is a top plan view of an evaporator constructed in accordance with my invention. Fig. 2 is a vertical longitudinal section through one of the evaporating pans and its supports. Fig. 3 is a vertical transverse section through the rear end of one of the evaporating pans and the coacting support.

In carrying my invention into practice, I provide an evaporating apparatus comprising any desired number of oblong rectangular evaporating pans 1, of any suitable length, width and depth, a series of three or more evaporating pans arranged in a row being preferably employed on account of economy of steam consumption, and according to the amount of juice to be evaporated within a given time. Within each of these pans is disposed a heating or radiating coil 2, composed of longitudinal parallel pipe sections connected by elbows alternately at opposite ends of the coil to provide for the back and forth circulation of the steam and the quick distribution of the radiated heat throughout the entire area of the pan. The forward ends of the terminal pipes of the coil are connected by reducing couplings 3 with exhaust pipes 4 which may be provided, if desired, with controlling valves 5, while the central portion of the coil is connected with a steam feed pipe 6 having a controlling valve 7. The feed pipe 6 connected with the radiator coil of the first evaporating pan of the series is connected by a T-coupling 8 with a main steam supply pipe 9 provided with a controlling valve 10 and leading from a boiler or other source of steam supply, while the feed pipes 6 of the radiator coils of the remaining pans of the series are connected with a branch steam supply pipe 11 also coupled by the T connection 8 to the main steam supply pipe 9. The radiator coils are preferably supported at a level above the bottoms of the pans 1 to maintain them out of contact with the walls of the pans, so that all of the radiated heat will be taken up by the sap or juice and waste of heat reduced through the radiation of the same through the walls of the pans to the external atmosphere. In practice, the radiators, feed pipes and branch supply pipe are preferably constructed of $\frac{3}{4}$ inch piping, the main steam line of inch piping and the exhaust pipes of $\frac{1}{8}$ inch piping, whereby the outlet of the steam through the exhaust pipes will be retarded sufficiently to insure the filling of the radiators with steam for the utilization of all the heat units before the steam exhausts, the retarding action being rendered variable by means of the valves 5 when employed. Steam from the source of supply at from 40 to 50 lb. pressure may, therefore, be employed with efficiency to rapidly heat the coils and contents of the evaporating pans, and by means of the valves 6 and 7, or the use of the valves 7 alone, the supply of steam to the coils and amount of heat radiated at any time may be regulated to control the boiling of the juice and prevent the same from boiling over the pans with resultant loss from waste. By this mode of controlling the steam supply and exhaust it is found that the juice within a filled pan of, say, 75 gallons capacity, may be brought to a boil within from five to seven minutes, thus enabling the juice to be boiled with maximum economy of time and labor and the use of steam. The evaporator pans may be provided or not with removable covers, as desired.

Each evaporating pan may be provided or not at its rear end with a draw-off faucet 12, for the withdrawal of the purified juice or sap, and in practice I preferably provide means whereby the pans may be tilted for the withdrawal of the juice or sap by gravity without varying the normal arrangement of the heating coils and pipes. As shown, the front end of each pan rests upon a suitable support 13, herein shown in the form of an ordinary trestle, while beneath the rear end of the pan is arranged a similar support or trestle 14, which terminates below the pan and is provided with a pair of standards 15 extending upwardly beyond the sides of the pan and carrying at their upper ends a cross bar 16. Secured to the bottom of the rear end of the pan is a cross bar 17, the ends of which extend through and are vertically movable in guide slots 18 in the standards and are connected with the lower ends of rods or bolts 19 forming a hanger loop or frame whereby the rear end of the pan is supported from the cross bar 16. The upper ends of said rods or bolts 19 are threaded and extend through openings 20 in the bar 16 and are provided with thumb nuts 21, whereby the said hanger loop or frame may be vertically adjusted to elevate or depress the rear end of the pan. The rod 16 also carries a depending hanger loop 22, the lower cross bar of which extends beneath the rear end of the radiator coil 2 and supports such end of the coil in normal horizontal position, the front end of the coil being supported by the pipes 4 and 6 from the pipes 9 and 11, which in practice are fixedly mounted in position in any suitable manner. The bar 17 is normally held in position to maintain the pan in a horizontal plane during the process of boiling and purifying the juice. When it is desired to draw off the purified juice, the nuts 21 are relaxed to permit the bar 17 to descend in the guide slots 18, thus lowering the rear end of the pan, to incline the pan to the proper degree for the gravitative discharge of its contents through the faucet 12 to permit the entire contents of the pan to be dipped out from the rear of the pan, as desired. This feature of adjustability of the pan without disturbing the heat coil also permits the interior of the pan and the pipes of the coil to be properly spaced so that all portions thereof may be thoroughly cleansed whenever necessary.

From the foregoing description, taken in connection with the drawings, the construction and mode of operation of my improved evaporating apparatus will be readily understood, and it will be seen that the invention provides an apparatus of this character whereby the juice or sap may be quickly and conveniently boiled and purified at a saving of time and labor over the ordinary practice of fire-boiling and without liability of scorching or otherwise injuring the juice, so that a higher grade product may be obtained. The construction and arrangement of the steam feed and exhaust connections of the system also permits of a number of evaporating pans to be employed at a time and at a minimum cost, as a single attendant may readily regulate the feed and exhaust of the steam as occasion requires and perform all other necessary incidental operations.

While I have described the draw-off faucet as arranged at the rear end of the pan, and an operation of lowering the rear end of the pan for the discharge of the contents of the pan through said faucet, it will be understood that the draw-off faucet or a suitably closed outlet may be arranged at the front end of the pan, in which event the pan will be tilted in the opposite direction to that described for the discharge of its contents.

Having thus described the invention, what I claim as new is:

1. An evaporating apparatus comprising a pan, a support for the front end of the pan on which the pan is free to tilt, a rear support carrying a cross bar, a cross bar extending under the rear end of the pan, rods adjustably suspending the last named cross bar from the first named cross bar, a heating coil arranged within the pan, steam supply and exhaust connections communicating with and supporting the front end of the coil, and a hanger carried by the upper rear cross bar for supporting the rear end of the coil.

2. An evaporating apparatus comprising a pan, a support for the front end of the pan on which the pan is free to tilt, a rear support carrying a cross bar, a cross bar attached to the rear end of the pan, rods adjustably suspending the last-named cross bar from the first-named cross bar, and a heating coil within the pan and supported independently thereof.

3. An evaporating apparatus comprising a pan, a support for the front end of the pan on which said pan is free to tilt, a rear support including a cross bar, a cross bar beneath the rear end of the pan, adjustable connections between said cross bars, a coil arranged within the pan, steam inlet and exhaust pipes communicating with and supporting the front end of the coil, and a hanger depending from the first-named cross bar and supporting the rear end of the coil.

In testimony whereof I affix my signature in presence of two witnesses.

THOMAS E. KENNAIRD.

Witnesses:
　AMIE HADDEN,
　VINCENT R. JONES.

---

Copies of this patent may be obtained for five cents each, by addressing the "Commissioner of Patents, Washington, D. C."